(12) United States Patent
Rochon et al.

(10) Patent No.: US 8,854,987 B2
(45) Date of Patent: Oct. 7, 2014

(54) DISTRIBUTING CELLS ON AN IMA LOGICAL LINK HAVING INACTIVE IMA SUB-LINKS

(75) Inventors: Michel Rochon, Kanata (CA); Adrian Alfred Ellsworth, Stittsville (CA); Martin Darwin, Ottawa (CA); John William Galway, Nepean (CA)

(73) Assignee: Alcatel Lucent, Boulogne Billancourt (FR)

( * ) Notice: Subject to any disclaimer, the term of this patent is extended or adjusted under 35 U.S.C. 154(b) by 1323 days.

(21) Appl. No.: 12/646,771

(22) Filed: Dec. 23, 2009

(65) Prior Publication Data

US 2011/0149976 A1    Jun. 23, 2011

(51) Int. Cl.
*H04L 12/26*    (2006.01)
*H04L 12/54*    (2013.01)
*H04J 3/14*    (2006.01)

(52) U.S. Cl.
CPC . *H04L 43/50* (2013.01); *H04J 3/14* (2013.01); *H04L 12/5601* (2013.01)
USPC ........................................ 370/248; 242/395.1

(58) Field of Classification Search
CPC ......... H04L 45/28; H04L 45/22; H04L 43/50; H04L 12/2697; H04L 45/00; H04L 12/5601; H04Q 11/0478; H04J 3/14

USPC .............. 370/395.1, 401, 536, 242, 244, 248, 370/250, 216, 218, 225, 465
See application file for complete search history.

(56) References Cited

U.S. PATENT DOCUMENTS

| | | | | |
|---|---|---|---|---|
| 5,970,067 | A | * | 10/1999 | Sathe et al. ............... 370/536 |
| 2003/0117945 | A1 | * | 6/2003 | Zboril ........................ 370/216 |
| 2006/0072579 | A1 | * | 4/2006 | Ward et al. .............. 370/395.1 |
| 2008/0159416 | A1 | * | 7/2008 | Melick et al. ............. 375/259 |

OTHER PUBLICATIONS

The ATM Forum Technical Committee, Inverse Multiplexing for ATM (IMA) Specification Version 1.1, AF-PHY-0086.001, Mar. 1999.

* cited by examiner

*Primary Examiner* — Dang Ton
*Assistant Examiner* — Mandish Randhawa
(74) *Attorney, Agent, or Firm* — Kramer Amado P.C.

(57) ABSTRACT

The invention is directed to a method and system for efficiently distributing Inverse Multiplexing over ATM (IMA) filler cells on IMA logical links having inactive or unusable IMA sub-links. Inactive IMA sub-links are identified during round-robin distribution of ATM data cells to active IMA sub-links. Predefined IMA filler cells are transmitted simultaneously on the identified inactive IMA sub-links when an ATM data cell is transmitted on an active IMA sub-link, thereby reducing the delay between transmitting ATM data cells.

17 Claims, 3 Drawing Sheets

DISTRIBUTING CELLS ON AN IMA LOGICAL LINK HAVING INACTIVE IMA SUB-LINKS

FIELD OF THE INVENTION

The invention is directed to packet switching communication networks, and in particular to improvements to Inverse Multiplexing over ATM logical links having inactive IMA sub-links.

BACKGROUND OF THE INVENTION

Asynchronous Transfer Mode (ATM) is a protocol used in telecommunication systems to transport voice and data at high speed. Inverse Multiplexing over ATM (IMA) is used to aggregate the bandwidth of several lower speed links (IMA sub-links) such as, for example, T1 or E1 cables, to effectively provide a single higher speed link (IMA logical link). IMA logical link is also referred to as IMA bundle or IMA group. IMA is described in ATM Forum standard (Inverse Multiplexing for ATM (IMA) Specification Version 1.1; AF-PHY-0086.001). As illustrated in FIG. 1, ATM cells of a traffic flow 102 to be carried over the IMA logical link are distributed across the lower speed IMA sub-links 112, 114, 116 at the transmitting end of the IMA logical link. ATM cell insertion happens in a round-robin fashion 108 among all the IMA sub-links 112, 114, 116 in the IMA link. IMA Control Protocol (ICP) cells are used to control the operation of the inverse multiplexing function. ICP cells need to be transmitted periodically on all IMA sub-links. In some cases, one or more of these lower speed sub-links may go into an inactive state 116 e.g. because of a fault, or may have simply been provisioned but left in an inactive state until needed at some future time. Active and inactive sub-links are sometimes referred to as usable or unusable sub-links respectively. When the transmit end of the IMA link has a pending ATM cell 104 to send, it must use a round-robin approach 108 to find the first available active sub-link on which to send the cell. However, if during that process the transmit end encounters an inactive sub-link (116), it must first send a filler cell 122 (or an ICP cell) over the inactive sub-link (116) before continuing to search for an active sub-link on which to send the current cell. Generally, if most of the IMA sub-links in an IMA logical link are active, the additional delay and processing resources taken by this process of dealing with inactive sub-links does not adversely impact the transmit end of the IMA link. However, when an IMA logical link has a large number of sub-links (e.g. 16 to 32) and majority of those sub-links are inactive, performance of the line card at the transmit end of the IMA logical link can be seriously degraded especially on a scaled system.

Therefore, a means of providing improved performance for IMA links having inactive sub-links is highly desirable.

SUMMARY OF THE INVENTION

One aspect of an embodiment of the present invention is directed to a method of transmitting filler cells on inactive sub-links of an Inverse Multiplexing over Asynchronous Transfer Mode (IMA) system having an IMA transmitter. The method comprises, for each pending ATM data cell, steps of: selecting a current IMA sub-link via a sub-link ID counter; determining if the current IMA sub-link is active; and responsive to a determination that the current IMA sub-link is not active: adding the current sub-link ID to a list of identified inactive IMA sub-links; incrementing the sub-link ID counter.

Some embodiments of the present invention further comprise steps of: responsive to a determination that the current sub-link is active: instructing the IMA transmitter to transmit a pending ATM data cell on the current sub-link; instructing the IMA transmitter to transmit a predefined IMA filler cell on each inactive sub-link identified in the list of identified inactive IMA sub-links; and incrementing the sub-link ID counter.

Some embodiments of the present invention further comprise a step of clearing the list of identified inactive IMA sub-links after instructing the IMA transmitter to transmit the predefined IMA filler cell.

In some embodiments of the present invention the IMA transmitter comprises a Field Programmable Gate Array (FPGA).

In some embodiments of the present invention the predefined filler cell is stored on the FPGA.

In some embodiments of the present invention the step of instructing the IMA transmitter to transmit a predefined filler cell on the identified inactive IMA sub-links comprises steps of: sending a message to the IMA transmitter comprising: an instruction to transmit the predefined filler cell on each inactive sub-link identified in the list; and a list of IMA sub-link IDs representing the list of identified inactive IMA sub-links.

Some embodiments of the present invention further comprise, prior to the step of determining if the IMA sub-link is active, steps of: determining if an IMA Control Protocol (ICP) cell should be transmitted on the current sub-link; and responsive to a determination that the ICP cell should be transmitted, transmitting the ICP cell on the current sub-link.

Another aspect of an embodiment of the present invention is directed to a system for transmitting filler cells on inactive sub-links of an Inverse Multiplexing over Asynchronous Transfer Mode (IMA) interface. The system comprises: a network processor configured to: receive pending ATM data cells; select a current IMA sub-link via a sub-link ID counter; determine whether a current IMA sub-link is active; responsive to a determination that the current IMA sub-link is not active: add the current sub-link ID to a list of identified inactive IMA sub-links; increment the IMA sub-link ID counter.

In some embodiments of the present invention the network processor is further configured to: responsive to a determination that the current sub-link is active: instruct the IMA transmitter to transmit a pending ATM data cell on the current sub-link; instruct the IMA transmitter to transmit a predefined IMA filler cell on each inactive sub-link identified in the list of identified inactive IMA sub-links; and increment the sub-link ID counter.

In some embodiments of the present invention the IMA transmitter comprises a Field Programmable Gate Array (FPGA).

In some embodiments of the present invention the predefined filler cell is stored on the FPGA.

In some embodiments of the present invention, instructing the IMA transmitter to transmit a predefined IMA filler cell on each inactive sub-link identified in the list of identified inactive IMA sub-links comprises: sending a message to the IMA transmitter comprising: an instruction to transmit the predefined filler cell on each inactive sub-link identified in the list; and a list of IMA sub-link IDs representing the list of identified inactive IMA sub-links.

In some embodiments of the present invention the network processor is further configured to: prior to the step of determining if the IMA sub-link is active: determine if an IMA Control Protocol (ICP) cell should be transmitted on the current sub-link; and responsive to a determination that the ICP cell should be transmitted, transmit the ICP cell on the current sub-link.

Another aspect of an embodiment of the present invention is directed to a program storage device readable by a machine, tangibly embodying a program of instructions executable by the machine to perform the method steps described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

Figure 1:
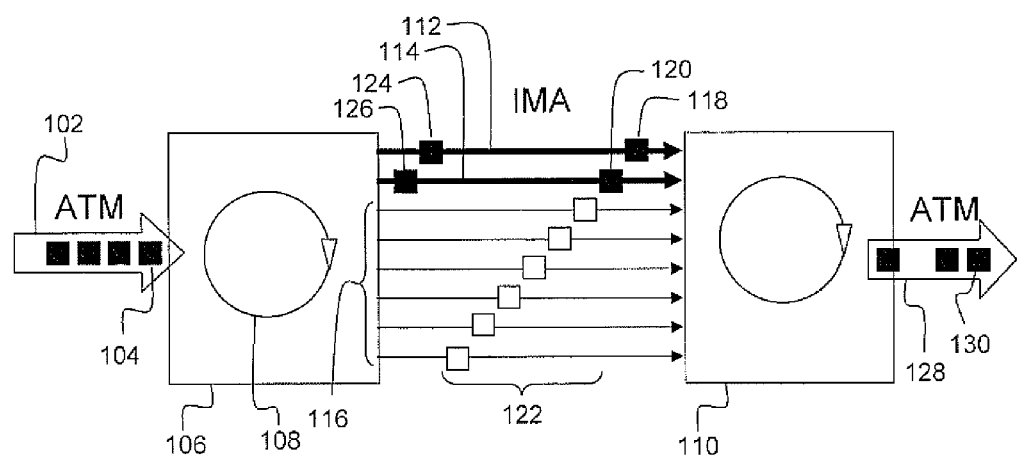
FIG. 1 illustrates a prior art representation of filler cells transmitted on inactive IMA sub-links.
Figure 2:
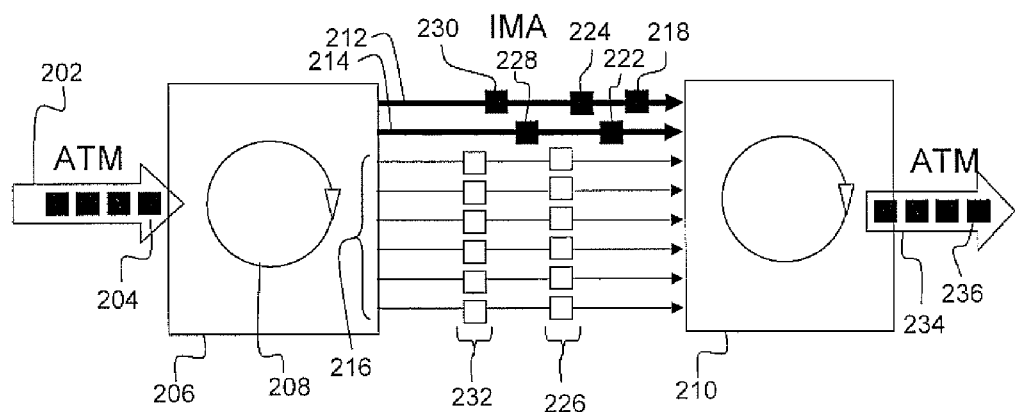
FIG. 2 illustrates a representation of filler cells transmitted on inactive IMA sub-links according to an embodiment of the present invention.

Embodiments of the present invention continually monitor which sub-links of the IMA logical link are in an inactive state, and immediately after (or before) an ATM data cell is transmitted on the IMA logical link, send a filler cell or ICP cell in parallel to all such inactive sub-links. Filler cells are sent on non-active links on which a data cell can not be transmitted. In effect, the filler cells are multicast to all the inactive sub-links at the same time (226, 232 of FIG. 2) instead of sending them to the sub-links serially (122 of FIG. 1). This can provide advantages of reducing delays in sending the next ATM cell while processing filler cells to be sent on inactive IMA sub-links. Note that filler cells also need to be transmitted on active sub-links when there are no ATM data cells in the queue at the time of transmission in order to maintain synchronization between the transmitter at the near end and the receiver at the far end of the IMA sub-link.

Figure 3:
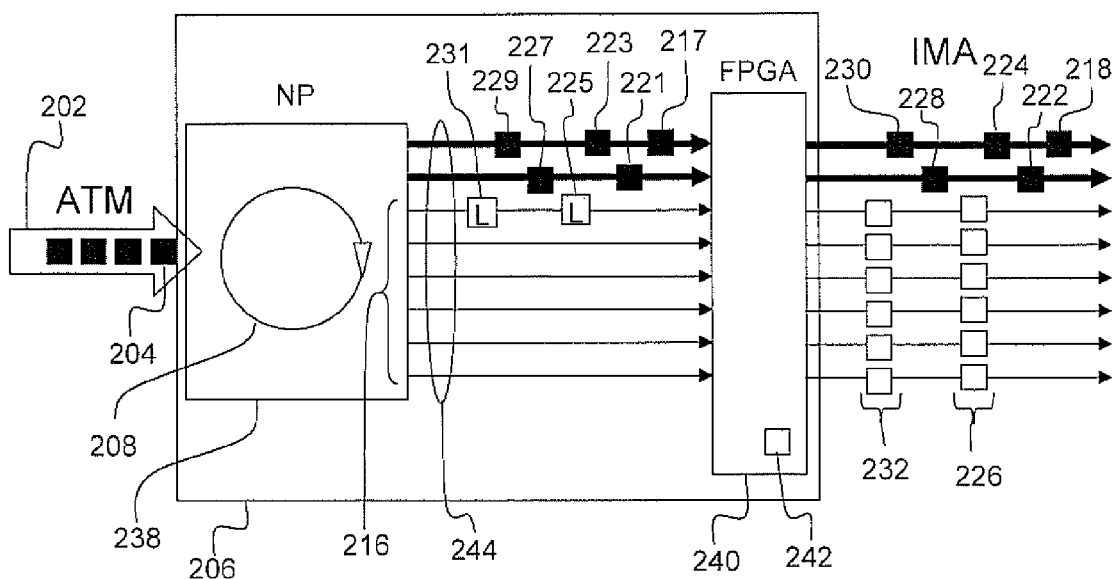
FIG. 3 illustrates a system for transmitting filler cells on inactive IMA sub-links according to an embodiment of the present invention.

As illustrated in FIG. 3, a transmit line card 206 includes a network processor (NP) 238, which distributes the cells 204 in the transmit queue 202 in a round robin manner 208. When an ATM data cell is to be transmitted over the IMA link, the NP 238 selects the current IMA Sub-link via an IMA sub-link ID and if the current IMA sub-link is active, it sends the ATM data cell 217 (or 221) with the current IMA sub-link ID over signal bus 244 to a Field Programmable Gate Array (FPGA) 240. Note that messages from the NP 238 to FPGA 240 are shown on individual lines representing the destination IMA sub-links. The messages are actually sent on a common bus 244, with an address in the message header indicating the destination IMA sub-link. Persons skilled in the art will recognize that other methods of forwarding the ATM data cells to the FPGA or other transmitter portion of the system could also be used. The FPGA handles link-level input/output (I/O) procedures and synchronization for each of the IMA sub-links, and transmits the ATM cell 218 (or 222) on the appropriate physical IMA sub-link.

The NP 238 determines if the current IMA Sub-link is active by retrieving a list of the active/inactive status of the IMA sub-links stored on a database maintained by the host central processor. The active/inactive list can be in the form of a mask, wherein the status of each sub-link is represented by a binary bit. The database can be local to the network processor 238. If the current IMA sub-link is inactive the NP 238 adds the current sub-link ID to a list of identified inactive IMA sub-links. This list can be in the form of a message that is populated with a list of destination IMA sub-links on to which a filler cell will be sent, but it does not send the Filler Cell List message to the FPGA until the next active IMA sub-link is found. The NP 238 then increments the IMA sub-link ID to select the next IMA sub-link. If subsequent IMA sub-links are also inactive, their sub-link IDs are added to the list of identified inactive IMA sub-links or filler message.

TABLE 1

Format of Filler Cell List message

| 0 | Filler hdr(chan c1) | | chan c2 | chan c3 |
|---|---|---|---|---|
| 1 | chan c4 | chan c5 | chan c6 | chan c7 |
| 2 | chan c8 | chan c9 | chan c10 | chan c11 |
| 3 | chan c12 | chan c13 | chan c14 | chan c15 |
| 4 | chan c16 | chan c17 | chan c18 | chan c19 |
| 5 | chan c20 | chan c21 | chan c22 | chan c23 |
| 6 | chan c24 | chan c25 | chan c26 | chan c27 |
| 7 | chan c28 | chan c29 | chan c30 | chan c31 |

Table 1 above illustrates a format of the Filler Cell List message, for instructing FPGA 240 to generate IMA filler cells on IMA sub-links. The Filler Cell List message header, "Filler Hdr" is a unique header recognizable by the FPGA and also contains the first sub-link ID ("chan C1") and a filler cell generation count. The filler cell generation count is used by the FPGA to determine the number of IMA filler cells to generate. The sub-link ID of each sub-link that requires an IMA filler cell is stored in subsequent blocks "chan c2" to "chan c31". Note that this message format is variable length and can accommodate up to 31 sub-link IDs.

When a subsequent IMA sub-link is found to be active, the NP 238 sends the ATM data cell 223 to the FPGA 240 and also sends Filler Cell List message 225, to the FPGA 240. The NP 238 then clears the list of identified inactive IMA sub-links in preparation for the next pending ATM data cell in queue 202. The Filler Cell List message 225 contains the list of identified inactive IMA sub-links and instructs the FPGA to send a predefined filler cell 242 to each inactive IMA sub-link identified in the Filler Cell List message 225 simultaneously as illustrated at 226. Note that in other embodiments NP 238 could be implemented in an FPGA, or NP 238 and FPGA 240 could be implemented in a single device.

Figure 4:
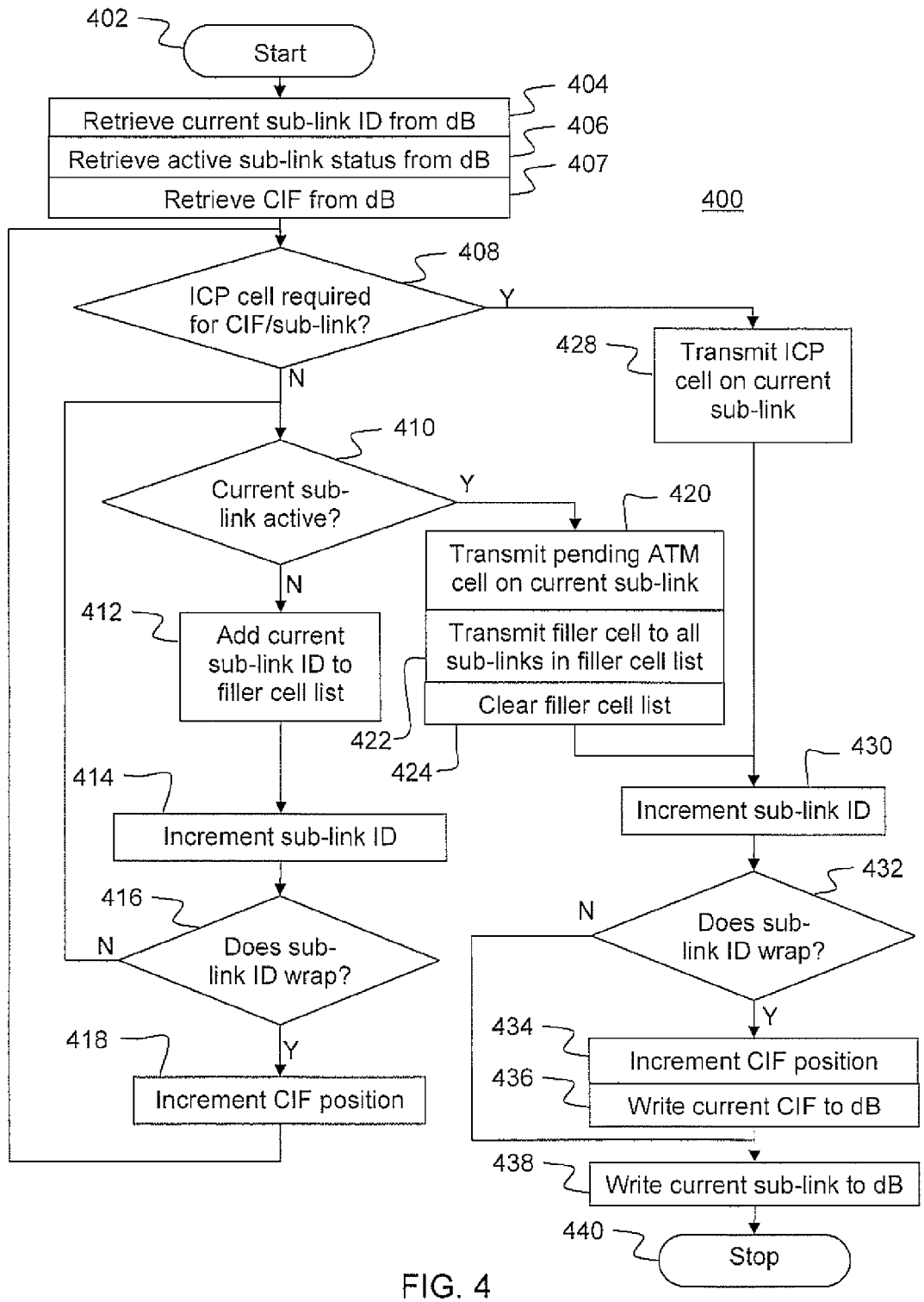
FIG. 4 illustrates the flowchart of a method for transmitting filler cells on inactive IMA sub-links according to an embodiment of the present invention.

An embodiment of a method 400 of the present invention will now be described with reference to FIG. 4. The method starts at step 402. At steps 404, 406 the NP 238 retrieves the current sub-link ID and the inactive/active status of each IMA sub-link, from a database for this IMA logical link or group, maintained by the central processor. At step 407, NP 238 retrieves the Cells in Frames (CIF) position from the same database. At step 408, NP 238 determines if an ICP cell is required to be sent on the current sub-link. This can be calculated as a function of the Cells in Frames (CIF) position and current sub-link ID. ICP cells need to be transmitted on IMA sub-links periodically to manage the IMA interface, to maintain IMA framing on an IMA sub-link, irrespective if the current IMA sub-link is active or not. ICP cells are generated individually by the NP on each link.

If at step 408, the NP 238 determines that an ICP cell is not required to be sent, then at step 410, the NP 238 determines if the current sub-link is active by comparing the current sub-link ID against a status mask retrieved at step 406. If the NP 238 determines that the current link is inactive, then at step 412 NP 238 adds the current sub-link ID to a local list of identified inactive IMA sub-links. If the local list of identified inactive IMA sub-links does not exist, then the list is initialized before the current sub-link ID is added to the list. At each subsequent pass through step 412, additional sub-link IDs are added to the list for later transmission. This avoids the time delay and cost of NP processor cycles to build and send a filler cell on each inactive IMA sub-link while there is a pending ATM data cell in the ATM queue 202. At step 414, the sub-link ID is incremented locally to point at the next current IMA sub-link.

At step 416 the NP 238 determines if the sub-link ID has wrapped around to the first sub-link. If the sub-link ID has not wrapped around, the process loops back to step 410. If the NP 238 determines that the sub-link ID has wrapped around to the first sub-link, then the process continues to step 418 where the CIF position is incremented. The process then loops back to step 408.

If the NP 238 determines at step 410, that the current sub-link is active, then at step 420, the NP 238 sends an ATM message to the FPGA 240 to transmit the pending ATM cell on the interface of the current IMA sub-link. The ATM message can be in the form of an ATM data cell, with a header prepended to the cell containing the destination IMA sub-link ID. At step 422 the NP 238 determines if there are sub-link Ds in the local list of identified inactive IMA sub-links, and if there are, the NP 238 then sends Filler Cell List message 225 (or 231) to the FPGA 240. If there are no sub-link IDs in the local list, or if the local list does not exist or is not initialized, this means that there are no inactive links on which filler cells need to be sent.

A filler cell can also be sent when there are no ATM data cells present in the transmit queue 202, which could occur frequently. In this case, filler cells could be sent on active sub-links as well as inactive sub-links and the Filler Cell List Message could contain sub-link IDs for active sub-links. The Filler Cell List message 225 contains the list of identified inactive IMA sub-links and instructs the FPGA to send a predefined filler cell 242 to each inactive IMA sub-link identified in the Filler Cell List message 225 simultaneously as illustrated at 226. In one embodiment, the Filler Cell List message is tagged with the address of the first inactive sub-link.

At step 424, the NP 238 then clears the list of identified inactive IMA sub-links in preparation for the next pending ATM cell in queue 202. Note that the pending ATM cell could be a data cell or a filler cell. The Filler Cell List message 225 contains the list of identified inactive IMA sub-links and instructs the FPGA to send a predefined IMA filler cell 242 to each inactive IMA sub-link identified in the Filler Cell List message 225 simultaneously as illustrated at 226. The process then moves to step 430 described below.

If at step 408, the NP 238 determines that an ICP cell is required to be sent, at step 428, the NP 238 sends a message to the FPGA 240 on bus 244 to transmit the appropriate ICP cell on the current IMA sub-link. The ICP message can be in the form of an ATM ICP cell, with a header prepended to the cell containing the destination IMA sub-link ID. Alternatively, the destination IMA sub-link ID could be appended to the cell instead of prepended. The process the proceeds to step 430.

At step 430, the sub-link ID is incremented and at step 432, the NP 238 determines if the sub-link ID has wrapped around to the first sub-link. If the sub-link ID has not wrapped around, the process skips to step 438. If the sub-link ID has wrapped around, it means that all of the sub-links have been accessed and the next CIF should be considered. The CIF position is incremented at step 434. At step 436, the newly updated CIF position is written to the database, and at step 438 the current sub-link ID is written to the database, so that the host processor of the line card can maintain an accurate status of the IMA interface. The process then stops at step 440, ready to process the next pending ATM cell in queue 202.

Alternatively, steps 420 and 422 could be executed in reverse sequence. In both embodiments, filler cells are assembled by the FPGA and transmitted only in conjunction with transmission of an ATM data cell. Simultaneous transmission of filler cells on each inactive IMA sub-link is managed by the FPGA.

Note that there are other circumstances in which filler cells need to be generated, independently of the reception of ATM cells. If there are no ATM cells or not enough ATM cells, in the ATM queue 202, filler and ICP cells still need to be transmitted on all the IMA sub-links on a regular basis to maintain IMA sub-link integrity or synchronization. The generation of filler cells in these circumstances could be based on the output of a traffic shaper or based on a timer.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of transmitting filler cells on inactive sub-links of an Inverse Multiplexing over Asynchronous Transfer Mode (IMA) system having an IMA transmitter, the method comprising, for each pending ATM data cell:
   selecting a current IMA sub-link via a sub-link ID counter;
   determining if said current IMA sub-link is active; and,
   responsive to a determination that said current IMA sub-link is not active:
   adding said current sub-link ID to a list of identified inactive IMA sub-links and incrementing said sub-link ID counter; and, responsive to a determination that the current IMA sub-link is active:
   instructing the IMA transmitter to transmit a predefined IMA filler cell on each inactive IMA sub-link identified in the list of identified inactive IMA sub-links and clearing the list of identified inactive IMA sub-links 2. The method of claim 1, further comprising, responsive to the determination that said current IMA sub-link is active:
   instructing said IMA transmitter to transmit a pending ATM data cell on said current IMA sub-link; and
   incrementing said sub-link ID counter.

3. The method of claim 2, wherein said IMA transmitter comprises a Field Programmable Gate Array (FPGA).

4. The method of claim 3, wherein said predefined filler cell is stored on said FPGA.

5. The method of claim 2, further comprising:
   sending a message to said IMA transmitter comprising an instruction to transmit said predefined filler cell on each inactive IMA sub-link identified in said list and a list of IMA sub-link IDs representing said list of identified inactive IMA sub-links.

6. The method of claim 2, further comprising, prior to said step of determining if said IMA sub-link is active:
   determining if an IMA Control Protocol (ICP) cell should be transmitted on said current IMA sub-link; and
   responsive to a determination that said ICP cell should be transmitted, transmitting said ICP cell on said current IMA sub-link.

7. A non-transitory program storage device readable by a machine, tangibly embodying a program of instructions executable by the machine to perform the method steps of claim 1.

8. The method of claim 1, further comprising:
   multicasting the filler cells to all of the identified inactive IMA sub-links simultaneously.

9. The method of claim 1, further comprising:
   sending the filler cells on active IMA sub-links when there are no ATM data cells in a queue at a time of transmission.

10. A system for transmitting filler cells on inactive sub-links of an Inverse Multiplexing over Asynchronous Transfer Mode (IMA) interface, the system comprising:
    a sub-link ID counter; and
    a network processor configured to receive pending ATM data cells, select a current IMA sub-link via the sub-link ID counter, determine whether a current IMA sub-link is active,
    responsive to a determination that said current IMA sub-link is not active:
    add said current sub-link ID to a list of identified inactive IMA sub-links, and
    increment the sub-link ID counter and,
    responsive to a determination that the current IMA sub-link is active:
    instruct the IMA transmitter to transmit a predefined IMA filler cell on each inactive IMA sub-link identified in the list of identified inactive IMA sub-links and clear the list of identified inactive IMA sub-links.

11. The system of claim 10, wherein said network processor is further configured to, responsive to the determination that said current IMA sub-link is active:
    instruct said IMA transmitter to transmit a pending ATM data cell on said current IMA sub-link and increment said sub-link ID counter.

12. The system of claim 11, wherein said IMA transmitter comprises a Field Programmable Gate Array (FPGA).

13. The system of claim 12, wherein said predefined filler cell is stored on said FPGA.

14. The system of claim 11, wherein the network processor is further configured to send a message to said IMA transmitter comprising an instruction to transmit said predefined filler cell on each inactive IMA sub-link identified in said list and a list of IMA sub-link IDs representing said list of identified inactive IMA sub-links.

15. The system of claim 14, wherein said network processor is further configured to, prior to said step of determining if said IMA sub-link is active, determine if an IMA Control Protocol (ICP) cell should be transmitted on said current IMA sub-link, and responsive to a determination that said ICP cell should be transmitted, transmit said ICP cell on said current IMA sub-link.

16. The system of claim 10, wherein the network processor is further configured to multicast the filler cells to all of the identified inactive IMA sub-links simultaneously.

17. The system of claim 10, wherein the network processor is further configured to send the filler cells on active IMA sub-links when there are no ATM data cells in a queue at a time of transmission.

* * * * *